US012591779B1

(12) United States Patent
Ardazi et al.

(10) Patent No.: US 12,591,779 B1
(45) Date of Patent: Mar. 31, 2026

(54) CAPABILITY AWARE LANGUAGE MODEL WITH IMPROVED COMPUTATIONAL EFFICIENCY

(71) Applicant: Intuit Inc., Mountain View, CA (US)

(72) Inventors: Shai Ardazi, Petah Tikva (IL); Ofir Ben Shoham, Petah Tikva (IL); Matan Vetzler, Ramat Gan (IL); Sagiv Antebi, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/351,876

(22) Filed: Oct. 7, 2025

(51) Int. Cl.
    *G06N 3/082* (2023.01)
(52) U.S. Cl.
    CPC .................................... *G06N 3/082* (2013.01)
(58) Field of Classification Search
    None
    See application file for complete search history.

(56) References Cited

U.S. PATENT DOCUMENTS

2025/0094709 A1* 3/2025 Tuli ...................... G06F 40/284

OTHER PUBLICATIONS

Hubara et al. "Accelerated sparse neural training: A provable and efficient method to find N:M transposable masks", arXiv:2102.08124v2 [cs.AI] Oct. 20, 2021, pp. 18 (Year: 2021).*

Frantar et al. ("SparseGPT: Massive Language Models Can be Accurately Pruned in One-Shot", arXiv:2301.00774v3 [cs.LG] Mar. 22, 2023, pp. 14 (Year: 2023).*
Chitty-Venkata et al. ("WActiGrad: Structured Pruning for Efficient Finetuning and Inference of Large Language Models on AI Accelerators", LNCS 14802, 2024, pp. 317-331 (Year: 2024).*
Sanh V., et al., "Movement Pruning: Adaptive Sparsity by Fine-Tuning", Oct. 23, 2020, 14 pages.
Jiang A. W., et al., "Mixtral of Experts", Jan. 8, 2024, 13 pages.
Chen, Y., et al., "EE-LLM: Large-Scale Training and Inference of Early-Exit Large Language Models with 3D Parallelism", Jun. 16, 2024, 27 pages.

* cited by examiner

*Primary Examiner* — Li Wu Chang
(74) *Attorney, Agent, or Firm* — Lathrop GPM LLP

(57) ABSTRACT

A method including receiving an input to a language model having an initial computational efficiency. During processing the language model outputs a first boundary token during a selected execution phase of the language model. Prior to the selected execution phase, the language model is modified with a designated pruning weight mask. The language model also outputs, during processing, a second boundary token during a subsequent execution phase. Prior to the subsequent execution phase, the language model is modified with a successive pruning weight mask. At least one of the designated pruning weight mask and the successive pruning weight mask modifies the language model to have final computational efficiency greater than the initial computational efficiency. The language model generates a number of tokens during the execution phases, and the tokens are returned.

18 Claims, 9 Drawing Sheets

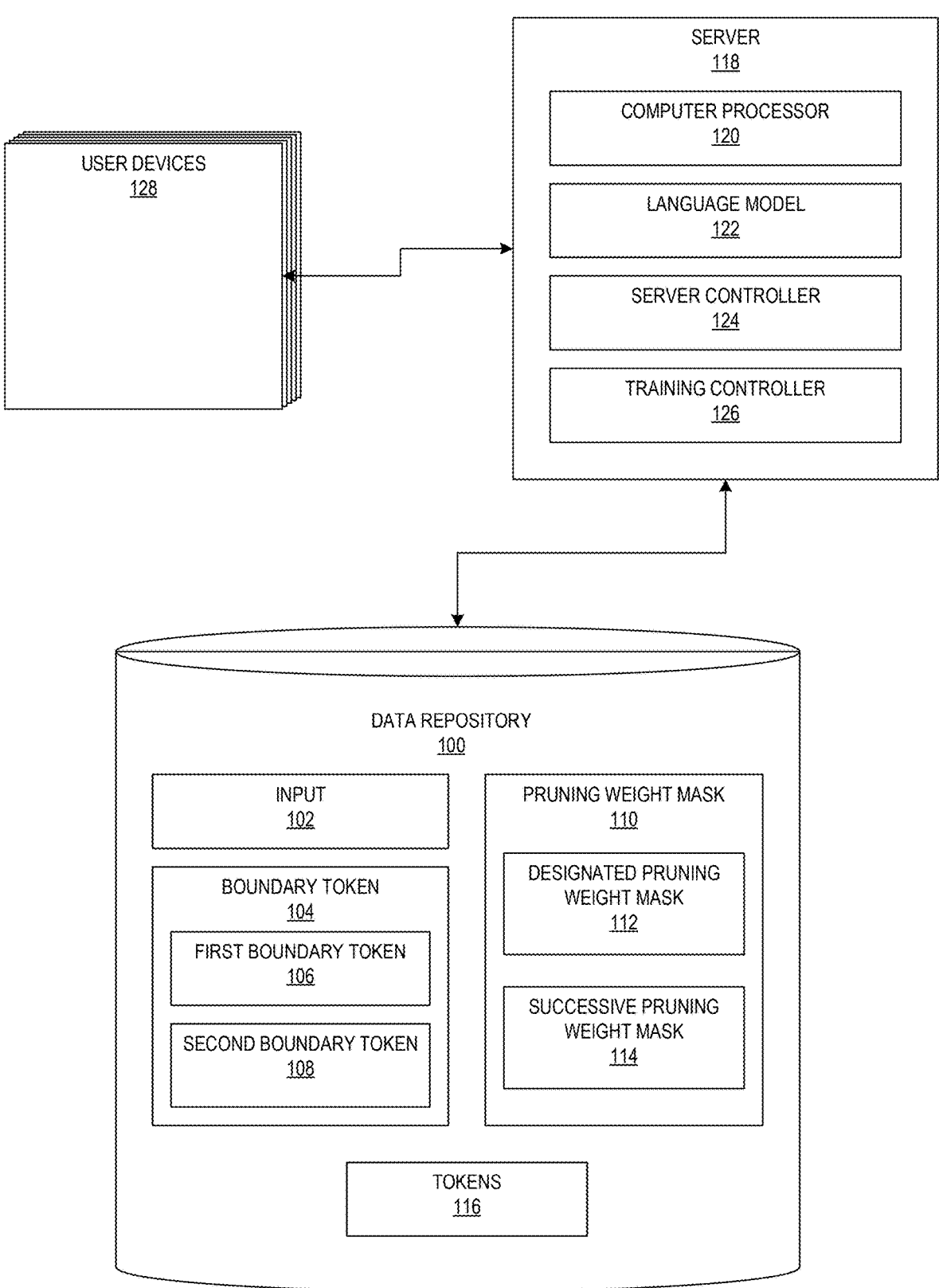

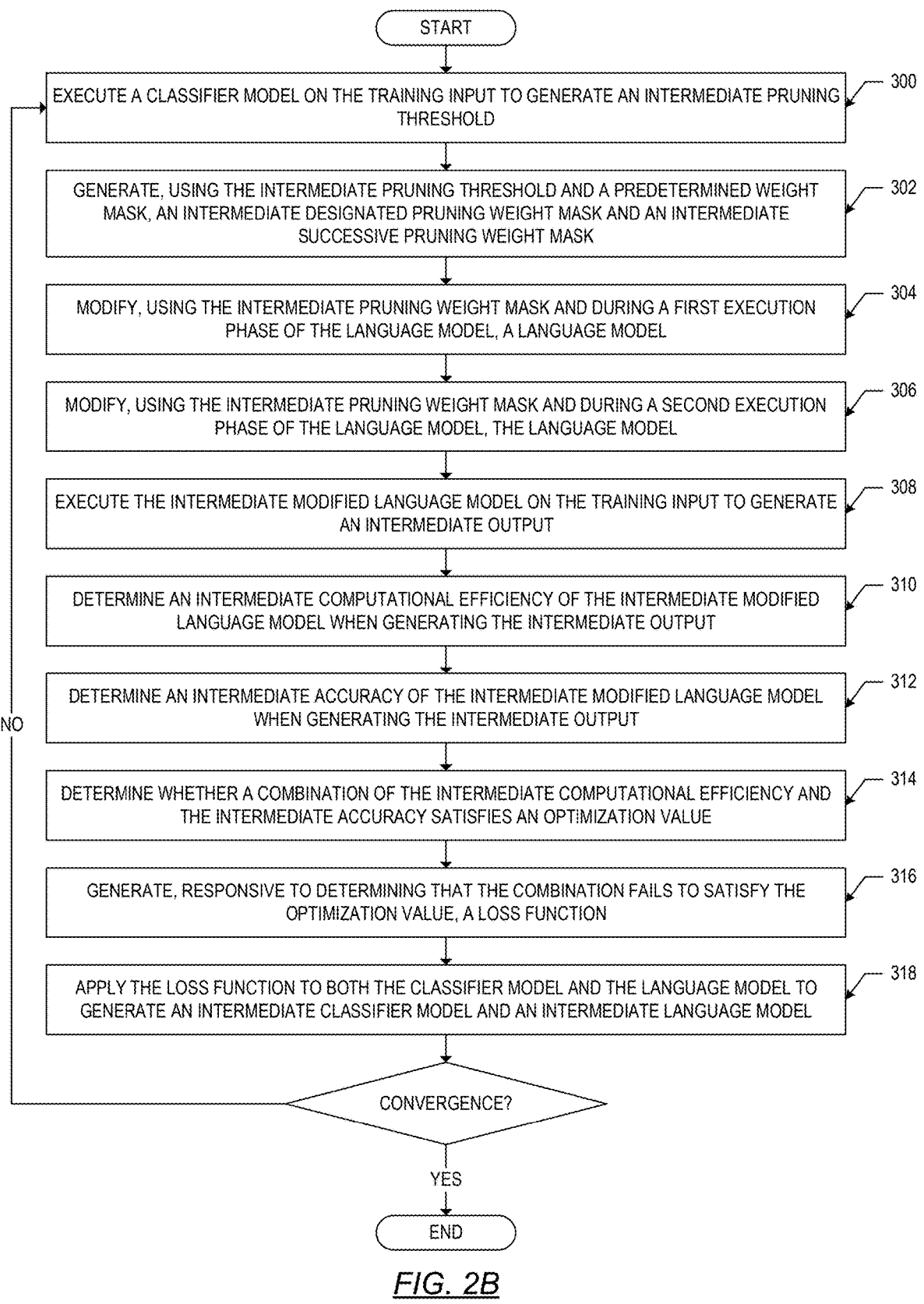

START

EXECUTE A CLASSIFIER MODEL ON THE TRAINING INPUT TO GENERATE AN INTERMEDIATE PRUNING THRESHOLD ⟋— 300

GENERATE, USING THE INTERMEDIATE PRUNING THRESHOLD AND A PREDETERMINED WEIGHT MASK, AN INTERMEDIATE DESIGNATED PRUNING WEIGHT MASK AND AN INTERMEDIATE SUCCESSIVE PRUNING WEIGHT MASK ⟋— 302

MODIFY, USING THE INTERMEDIATE PRUNING WEIGHT MASK AND DURING A FIRST EXECUTION PHASE OF THE LANGUAGE MODEL, A LANGUAGE MODEL ⟋— 304

MODIFY, USING THE INTERMEDIATE PRUNING WEIGHT MASK AND DURING A SECOND EXECUTION PHASE OF THE LANGUAGE MODEL, THE LANGUAGE MODEL ⟋— 306

EXECUTE THE INTERMEDIATE MODIFIED LANGUAGE MODEL ON THE TRAINING INPUT TO GENERATE AN INTERMEDIATE OUTPUT ⟋— 308

DETERMINE AN INTERMEDIATE COMPUTATIONAL EFFICIENCY OF THE INTERMEDIATE MODIFIED LANGUAGE MODEL WHEN GENERATING THE INTERMEDIATE OUTPUT ⟋— 310

DETERMINE AN INTERMEDIATE ACCURACY OF THE INTERMEDIATE MODIFIED LANGUAGE MODEL WHEN GENERATING THE INTERMEDIATE OUTPUT ⟋— 312

DETERMINE WHETHER A COMBINATION OF THE INTERMEDIATE COMPUTATIONAL EFFICIENCY AND THE INTERMEDIATE ACCURACY SATISFIES AN OPTIMIZATION VALUE ⟋— 314

GENERATE, RESPONSIVE TO DETERMINING THAT THE COMBINATION FAILS TO SATISFY THE OPTIMIZATION VALUE, A LOSS FUNCTION ⟋— 316

APPLY THE LOSS FUNCTION TO BOTH THE CLASSIFIER MODEL AND THE LANGUAGE MODEL TO GENERATE AN INTERMEDIATE CLASSIFIER MODEL AND AN INTERMEDIATE LANGUAGE MODEL ⟋— 318

NO

CONVERGENCE?

YES

END

*FIG. 2B*

No Pruning

No Pruning

20% Pruned Weights
Regular Pruning (e.g., Movement Pruning)

20% Pruned Weights
Regular Pruning (e.g., Movement Pruning)

400
COMPUTING
SYSTEM

CAPABILITY AWARE LANGUAGE MODEL WITH IMPROVED COMPUTATIONAL EFFICIENCY

CROSS-REFERENCE TO RELATED APPLICATIONS

This application is related to U.S. application Ser. No. 19/090,245, filed Mar. 25, 2025, the entirety of which is hereby incorporated by reference.

BACKGROUND

Language models (e.g., CHATGPT® by OpenAI) are useful computing tools. A language model can receive a natural language command or query as an input (known as a prompt) and generate, as output, desired natural language text. The output may be, for example, an answer to a query, a summarization of a larger document, a suggestion for a next sentence or paragraph for a text under draft, etc.

Certain language models are known as large language models. A large language model may have billions of parameters, each of which are used in calculations when the large language model is executed on a prompt. Thus, language models may use substantial computational resources when executed, leading to increased latency (waiting time while the computer executes the language model), power consumption (electricity), and cost (in terms of use of available computational resources, as well as in dollars). A similar problem in computational costs may occur in other types of language models. For example, a small language model (i.e., a non-large language model) may use fewer computational resources than a large language model, but still may use greater computational resources than desired.

Thus, a technical problem is presented. The technical problem is how to improve the computational speed of a computer by increasing the computational efficiency of executing a language model.

SUMMARY

One or more embodiments provide for a method. The method includes receiving an input to a language model having an initial computational efficiency. The method also includes processing the language model on the input. The method also includes receiving, during processing, a first boundary token output by the language model during a selected execution phase of the language model. The method also includes modifying, prior to the selected execution phase, the language model with a designated pruning weight mask. The designated pruning weight mask applies to the language model during the selected execution phase. The method also includes receiving, while processing, a second boundary token output by the language model during a subsequent execution phase of the language model, after the selected execution phase. The method also includes modifying, prior to the subsequent execution phase, the language model with a successive pruning weight mask. The successive pruning weight mask is different than the designated pruning weight mask. The successive pruning weight mask applies to the language model during the subsequent execution phase. At least one of the designated pruning weight mask and the successive pruning weight mask modifies the language model to a modified language model including a final computational efficiency greater than the initial computational efficiency. The method also includes generating, during the selected execution phase with the designated pruning weight mask and during the subsequent execution phase with the successive pruning weight mask, a number of tokens. The method also includes returning the number of tokens.

One or more embodiments also provide for a system. The system includes a computer processor and a data repository in communication with the computer processor. The data repository stores an input, a first boundary token, and a second boundary token. The data repository also stores a designated pruning weight mask and a successive pruning weight mask. The successive pruning weight mask is different than the designated pruning weight mask. The data repository also stores a number of tokens. The system also includes a language model in communication with the computer processor and having a first computational efficiency. The language model, when executed by the computer processor, is programmed to: process the language model on the input. The language model is also programmed to generate the first boundary token during a selected execution phase of the language model. The language model is also programmed to generate the second boundary token during a subsequent execution phase of the language model. The subsequent execution phase is after the selected execution phase. The language model is also programmed to generate, during the selected execution phase with the designated pruning weight mask and during the subsequent execution phase with the successive pruning weight mask, a number of tokens. The language model is also programmed to return the number of tokens. The system also includes a server controller configured, when executed by the computer processor, to receive the input. The server controller is also configured to receive, during processing of the language model, the first boundary token. The server controller is also configured to modify, prior to the selected execution phase, the language model with the designated pruning weight mask. The server controller is also configured to receive, while processing, the second boundary token. The server controller is also configured to modify, prior to the subsequent execution phase, the language model with the successive pruning weight mask. At least one of applying the designated pruning weight mask during the selected execution phase, and applying the successive pruning weight mask during the subsequent execution mask, modifies the language model to a modified language model including a final computational efficiency greater than the initial computational efficiency.

One or more embodiments provide for another method. The method includes receiving a training input. The method also includes iterating a process until convergence a process. The process includes executing a classifier model on the training input to generate an intermediate pruning threshold. The process also includes generating, using the intermediate pruning threshold and a predetermined weight mask, an intermediate designated pruning weight mask and an intermediate successive pruning weight mask. The process also includes modifying, using the intermediate pruning weight mask and during a first execution phase of the language model, a language model. Using the intermediate pruning weight mask reduces at least one of a number of weights of the language model defined by the predetermined weight mask. The process also includes modifying, using the intermediate pruning weight mask and during a second execution phase of the language model, the language model. Using the intermediate pruning weight mask reduces at least another of the number of weights. Modifying the language model during the first execution phase and the second execution phase generates an intermediate modified language model.

The process also includes executing the intermediate modified language model on the training input to generate an intermediate output. The process also includes determining an intermediate computational efficiency of the intermediate modified language model when generating the intermediate output. The process also includes determining an intermediate accuracy of the intermediate modified language model when generating the intermediate output. The process also includes determining whether a combination of the intermediate computational efficiency and the intermediate accuracy satisfies an optimization value. The process also includes generating, responsive to determining that the combination fails to satisfy the optimization value, a loss function. The process also includes applying the loss function to both the classifier model and the language model to generate an intermediate classifier model and an intermediate language model. Convergence occurs when the optimization value is satisfied and upon convergence the intermediate language model is a trained language model and the intermediate classifier model is a trained classifier model. The method also includes returning the trained language model and the trained classifier model.

Other aspects of the one or more embodiments will be apparent from the following description and the appended claims.

BRIEF DESCRIPTION OF DRAWINGS

FIG. 1A and FIG. 1B show a computing system, in accordance with one or more embodiments.

FIG. 2B shows a flowchart of a method for training a language model, in accordance with one or more embodiments.

Like elements in the various figures are denoted by like reference numerals for consistency.

DETAILED DESCRIPTION

Figure 1B:
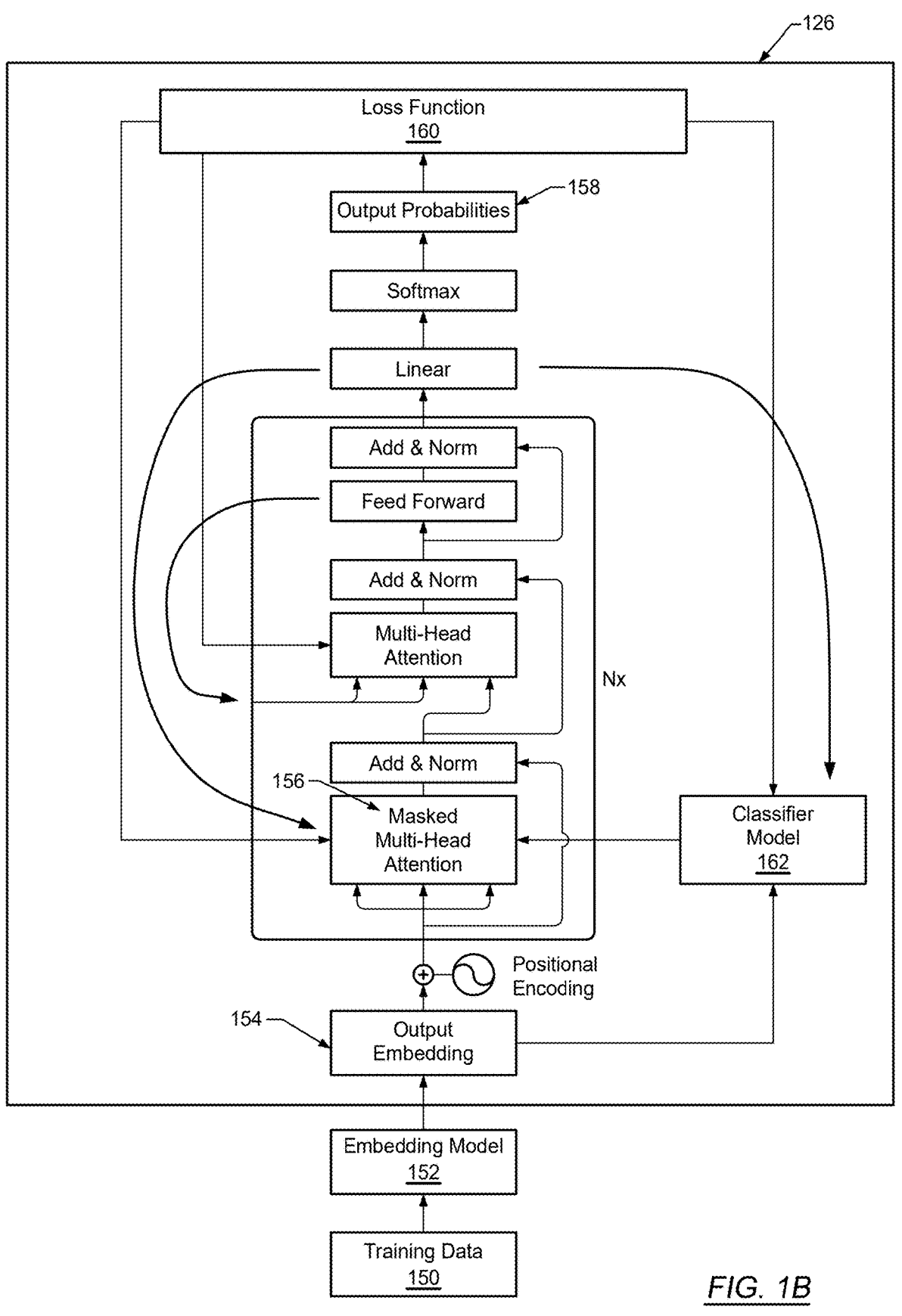

One or more embodiments are directed to a technical solution to the technical problem of how to improve the computational speed of a computer by increasing the computational efficiency of executing a language model. Specifically, one or more embodiments relate to changing the language model, or to changing the execution of the model, to reduce the number of parameters that the language model executes without significantly affecting the accuracy of the language model. In this manner, fewer computer processor cycles are used in the execution of the language model, and hence the computer processor executes the model more quickly.

The following figures provide the details of how one or more embodiments accomplish the above-identified technical solution. In summary, two techniques are provided for increasing the computational efficiency of a language model. In a first technique, a boundary token output by a language model during execution is used to identify a phase of execution of a reasoning language model. A different weight mask is then identified for each phase of execution of the reasoning language model. Each weight mask is used to deactivate or reduce one or more parameters of the reasoning language model in a corresponding execution phase, thereby reducing the number of processor cycles used to execute the reasoning language model.

Thus, for example, a reasoning language model may have a "thinking" phase, a "planning" phase, and an "answer" phase. In each phase, a different weight mask may be applied to the language model. The different weight masks are generated as described below with respect to the figures, but for purposes of this summary each weight mask is tailored to the corresponding phase to minimize computational resources used to execute the language model while concurrently minimizing the impact that deactivating (or reducing) model parameters has on the accuracy of the reasoning language model when generating an answer. The exact manner in which the weight masks operate is described in further detail below.

In addition to the first technique for increasing the computational efficiency of a language model as described above, a second technique is described. In the second technique, the input to the language model may be initially provided to a pruning classifier. As used herein, a pruning classifier is a classification machine learning model (e.g., a logistic regression model) that is trained as described with respect to FIG. 1B. The pruning classifier outputs a pruning threshold, which depends on the contents of the input. The pruning threshold is a number that is used to determine which weights in the language model should be deactivated (or reduced). The higher the pruning threshold, the more weights in the language model will be deactivated.

In particular, the pruning threshold is compared to a predetermined weight mask defined for the language model. The predetermined weight mask is a matrix of values that are associated with each of the parameters of the language model.

When a specific input is sent to the language model, the pruning threshold determined for that input is compared to each entry in the predetermined weight mask. The comparison is used to determine a pruning weight mask to be applied to the language model. In particular, when the value of an entry in the predetermined weight mask satisfies the pruning threshold, then the weight corresponding to the entry in the predetermined weight mask is set to zero (or reduced). Accordingly, again, the higher the pruning threshold, the greater the number of weights that are set to zero (or reduced).

The above-described process also may be understood by way of example. The following example is limited, compared to an operational system, but is simplified for clarity.

As indicated above, the predetermined weight mask is a matrix of numbers to which the output of the prediction model is compared in order to determine which weights of the language model to deactivate. In the example, the predetermined weight mask is a 1×3 matrix data structure containing the numbers "0.1," "0.5," and "0.7." Each of the numbers is associated with one of three weights of the language model, weight A, weight B, and weight C. Accordingly, "0.1" is associated with weight A, "0.5" is associated with weight B, and "0.7" is associated with weight C. Note that the weights themselves are not directly affected by the predetermined weight mask.

When a natural language query to the language model is received, the query is first input to a prediction model. The prediction model is trained (as described in relation to FIG. 1B) to predict a number that may be correlated (using the predetermined weight mask) to a number of weights of the language model that may be deactivated or reduced (as described below). The output of the prediction model may be referred to as a "pruning threshold."

For the purposes of this example, the pruning threshold is a number between 0 and 1. In the example, the prediction model outputs a pruning threshold of "0.6" in response to the natural language query input. The pruning threshold of "0.6" is a prediction that the language model may use fewer weights to process the query relative to a smaller prediction value (e.g., "0.1" or "0.5"). Determining exactly which weights may be deactivated depends on the predetermined weight mask.

Specifically, as used here, the predetermined weight mask serves as a series of threshold values used to determine which weights to deactivate, based on the prediction value. Continuing the example, the pruning threshold of "0.6" is compared to each of the values in the predetermined weight mask. Because "0.6" is greater than "0.1," weight A will be set to "0." Because "0.6" is greater than "0.5," weight B will be set to "0." However, because "0.6" is lower than "0.7," weight C remains unchanged. (In a different embodiment, one or more of the deactivated weights may be reduced rather than set to zero.) By deactivating some of the weights, the language model may be executed more quickly and efficiently with fewer processing cycles of a computer processor.

Changing the values of the weights is accomplished by using a pruning mask. The pruning mask is a matrix of numbers which is multiplied by the matrix of weights of the language model. The pruning mask values, in the example, are either "0s" or "1s." Specifically, in the example, the pruning mask is "0, 0, 1" and the matrix of weights is "weight A, weight B, weight C." The pruning mask is "0, 0, 1" in the example because when the pruning threshold was compared to the predetermined weight mask (as described above), a determination was made that weight A and weight B should be set to zero, but weight C should remain the same. When the pruning mask is multiplied by the matrix of weights, the matrix of weights becomes "0, 0, weight C." Thus, the resulting language model is modified.

Once the selected weights of the language model are deactivated (set to zero), the natural language query is fed as input to the modified language model (i.e., the language model with weights A and B set to "0"). The resulting output of the modified language model is then returned.

Note that the process is "dynamic," as the decision regarding which weights will be deactivated depends directly on the pruning threshold output by the prediction model. In turn, the output of the prediction model depends directly on the natural language query, which may change from time to time. Stated differently, different language model weights may be deactivated when different language model queries are received, because different queries may cause the prediction model to output different pruning thresholds. Note, however, the "predetermined weight mask" may not change from query to query (though the predetermined weight mask could be adjusted periodically, if desired).

The above-described scheme will automatically deactivate or reduce weights which contribute to the output of the language model. Additionally, because the deactivated or reduced weights are determined based on the input, the accuracy of the language model either is not affected, or is degraded less than deactivating random weights or deactivating a static, predetermined number of weights in the language model.

Application of the pruning weight mask to the language model generates a modified language model in that the weights in the attention heads of the language model are changed. Thus, the behavior of the model changes. However, importantly, the accuracy of the language model is not degraded substantially because the weights that contribute little or nothing to the output are the weights that are deactivated. Thus, the modified language model is computationally more efficient, relative to the language model prior to modification, without substantially affecting the accuracy of the model.

Thus, two techniques are presented (i.e., using the prediction model to generate a dynamic weight mask and using boundary tokens to identify different phases of reasoning language model execution and then using different weight masks in different execution phases). One or both of the techniques may be used at any given time. Combined, the computational efficiency of the language model may be greatly increased relative to simply executing the language model without a weight mask or relative to using a static weight mask. Therefore, multiple embodiments are provided for solving the technical problem of how to improve the computational speed of a computer by increasing the computational efficiency of executing a language model.

Attention is now turned to the figures. FIG. 1A and FIG. 1B show a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores an input (102). The input (102) is a natural language text statement or query. The input (102) may be a prompt to the language model, defined below. A prompt is one or more natural language statements that define a command to the language model, possibly together with additional instructions regarding how the language model should process the command.

The data repository (100) also stores several types of tokens. In general, a token is a group of alphanumeric text. For example, the token may be a word, a phrase, a sentence, a paragraph, multiple paragraphs, etc.

One of the types of tokens stored in the data repository (100) is a boundary token (104). The boundary token (104) is a specific type of token generated by a reasoning language model during execution. The boundary token (104) is a token that the reasoning language model uses during execution to indicate that the prior phase is finished and that the next phase will be initiated. The phases of execution may be, for example, "thinking," "planning," and "answering," though the language model may be programmed to execute more or fewer execution phases. A boundary token (104) is normally hidden from the user of the language model, but the language model can be commanded to reveal or output a boundary token (104), possibly among other output tokens. For example, the boundary token (104) may be output among the tokens (116) defined below.

The boundary token (104) contains more than just a token (e.g., a word) that indicates a transition of between the thinking, planning, and answering phases. The boundary token (104) also structures the reasoning language model's reasoning and forces the reasoning language model to follow a logical flow. For this reason, a boundary token (104)

contains information regarding the prior phase, such as ideation, decomposition of the problem the reasoning language model is considering, and other summary information regarding a logic train for answering the prompt. A boundary token (104) may contain embedded logic, styling, behavior commands that guide how the reasoning language model returns subsequent tokens, and possibly other information.

Because a reasoning language model often generates multiple boundary tokens, convenient terms may be used to refer to a particular boundary token generated during a particular phase of reasoning language model execution. Thus, for example, the boundary token (104) may be referred to as a "thinking boundary token," a "planning boundary token," or an "answer boundary token."

However, more generally, the boundary token (104) may be, for example, a first boundary token (106) or a second boundary token (108). The first boundary token (106) is an instance of the boundary token (104) that occurs prior to a subsequent instance of the boundary token (104) (i.e., the first boundary token (106) is generated prior to the first boundary token (106)). Likewise, the second boundary token (108) is an instance of the boundary token (104) that occurs after a prior instance of the boundary token (104) (i.e., the second boundary token (108) is generated after the first boundary token (106)). However, the first boundary token (106) and the second boundary token (108) are both instances of the boundary token (104), just generated at different execution phases of the reasoning language model.

The data repository (100) also stores a pruning weight mask (110). The pruning weight mask (110) is a matrix of values to be applied to the parameters or weights of the language model (122) (defined below). In an embodiment, the pruning weight mask (110) may be composed of zeros and ones, such that weights of the language model are set to zero or to their predetermined weight values when the pruning weight mask (110) is multiplied by the weight values of the language model. However, the pruning weight mask (110) may be values between zero and one in different embodiments. Use of the pruning weight mask (110) is described with respect to FIG. 2A and FIG. 2B. Examples of the pruning weight mask (110) are shown in FIG. 3A and FIG. 3B.

There may be multiple instances of a pruning weight mask (110) used in one or more embodiments, such as for example one different pruning weight mask for each execution phase of the reasoning language model. Thus, like the boundary token (104), the pruning weight mask (110) may be referred to using different terms to indicate an execution phase or a relative execution phase during which a particular instance of the pruning weight mask (110) is being used.

Accordingly, the pruning weight mask (110) may be a designated pruning weight mask (112) or a successive pruning weight mask (114). The designated pruning weight mask (112) is a weight mask that applies during a first execution phase of the reasoning language model that occurs prior to a second execution phase of the reasoning language model. Thus, for example, the designated pruning weight mask (112) may be applied to the reasoning language model, as described with respect to FIG. 2 and as exemplified in FIG. 3B, during an execution phase of the reasoning language model corresponding to the first boundary token (106). Similarly, the successive pruning weight mask (114) may be applied to the reasoning language model, as described with respect to FIG. 2A and FIG. 2B and as exemplified in FIG. 3B, during another execution phase of the reasoning language model corresponding to the second boundary token (108).

Thus, stated differently, the designated pruning weight mask (112) may apply during a first execution phase of the reasoning language model, where the initiation of the first execution phase is indicated by the reasoning language model generating the first boundary token (106). Similarly, the successive pruning weight mask (114) may apply during a second execution phase of the reasoning language model, where the initiation of the second execution phase is indicated by the reasoning language model generating the second boundary token (108). In the example, the first execution phase occurs prior to the second execution phase.

Note, however, that the "first" execution phase is not necessarily the initial execution phase that the reasoning language model initially engages in. For example, a reasoning language model may have three execution phases: "thinking," "planning," and "answering." In an example, the first execution phase (indicated by the generation of the first boundary token (106)) may be the "planning" phase, in which case the second execution phase (indicated by the generation of the second boundary token (108)) may be the "planning" phase. However, the first execution phase (indicated by the generation of the first boundary token (106)) may be the "planning" phase, in which case the second execution phase (indicated by the generation of the second boundary token (108)) may be the "answering" phase.

The data repository (100) also may store a number of tokens (116). Each of the tokens (116) are an instance of a "token," as defined above. In an embodiment, the tokens (116) refer to the tokens ultimately output by a language model. For example, the tokens (116) may be the tokens output by the language model after the method of FIG. 2A.

The system shown in FIG. 1A may include other components. For example, the system shown in FIG. 1A also may include a server (118). The server (118) is one or more computer processors, data repositories, communication devices, and supporting hardware and software. The server (118) may be in a distributed computing environment. The server (118) is configured to execute one or more applications, such as the language model, the modified language model, the classifier model (see classifier model (162) in FIG. 1B), the server controller (124), or the training controller (126). An example of a computer system and network that may form the server (118) is described with respect to FIG. 4A and FIG. 4B. The server (118) includes a computer processor (120). The computer processor (120) is one or more hardware or virtual processors which may execute computer readable program code that defines one or more applications, such as the language model, the modified language model, the classifier model, the server controller (124), or the training controller (126). An example of the computer processor (120) is described with respect to the computer processor(s) (402) of FIG. 4A.

The server (118) also includes a language model (122). The language model (122) is a natural language processing machine learning model. An example of the language model (122) may be a large language model (122), such as CHATGPT® by OpenAI. However, different language models (122) may be used. Use of the language model (122) is described with respect to FIG. 2A.

The language model (122) may be characterized as having a first computational efficiency (relative to the second computational efficiency of the modified language model, defined below). As used herein, "computational efficiency" is defined in inverse proportion to the number of processor cycles that the computer processor (120) uses to execute the language model (122) on the input (102). Thus, the higher the number of processor cycles that the computer processor (120) uses to execute the language model (122), the lower the first computational efficiency. Conversely, the lower the number of processor cycles that the computer processor (120) uses to execute the language model (122), the higher the first computational efficiency.

The server (118) also includes a modified version of the language model (122). The modified language model is generated from the language model (122) by modifying the weights of the language model (122), as described with respect to FIG. 2A. Thus, the modified language model is modified relative to the language model (122). Training of the modified language model is described with respect to FIG. 2B.

The modified language model may be characterized as having a second computational efficiency (relative to the first computational efficiency of the language model (122)). The definition of "computational efficiency" for the second computational efficiency is the same as for the first computational efficiency. Thus, the higher the number of processor cycles that the computer processor (120) uses to execute the modified language model, the lower the second computational efficiency. Conversely, the lower the number of processor cycles that the computer processor (120) uses to execute the modified language model, the higher the second computational efficiency.

Figure 2A:
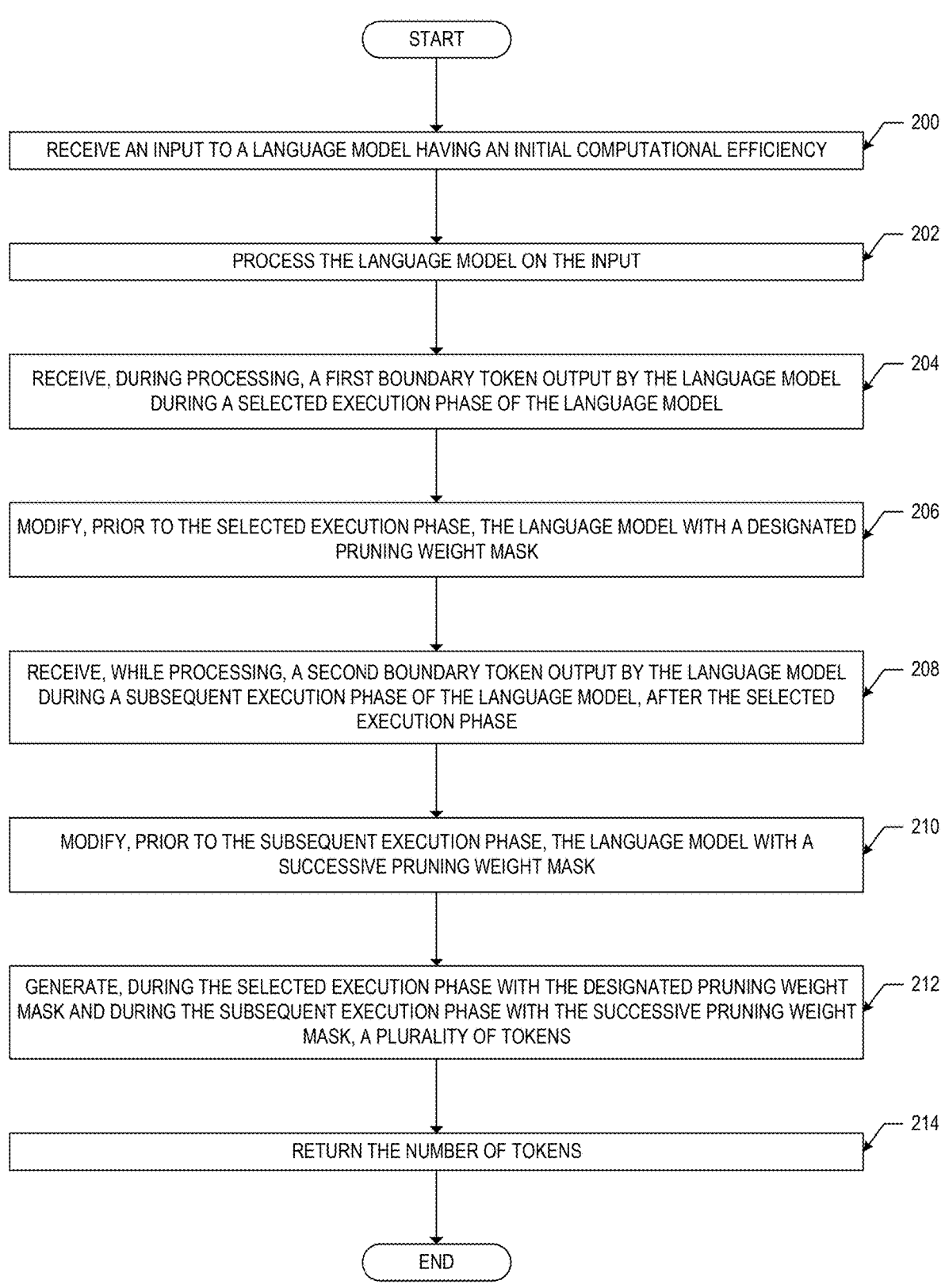
FIG. 2A shows a flowchart of a method for increasing the computational efficiency of executing a language model, in accordance with one or more embodiments.
Figure 3A:
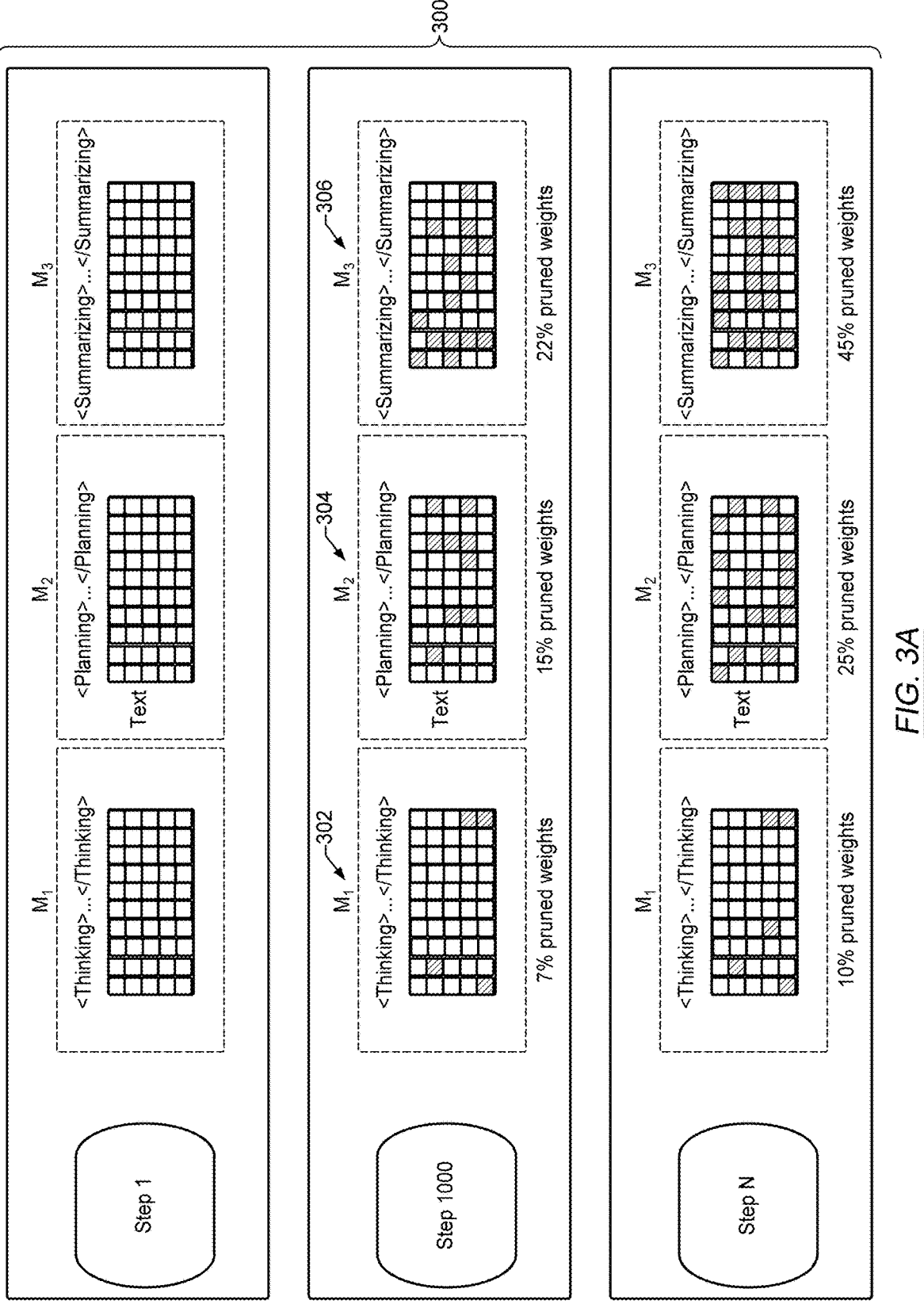
FIG. 3A and FIG. 3B show an example of an in-use example of a method for increasing the computational efficiency of executing a language model, in accordance with one or more embodiments.
Figure 3B:
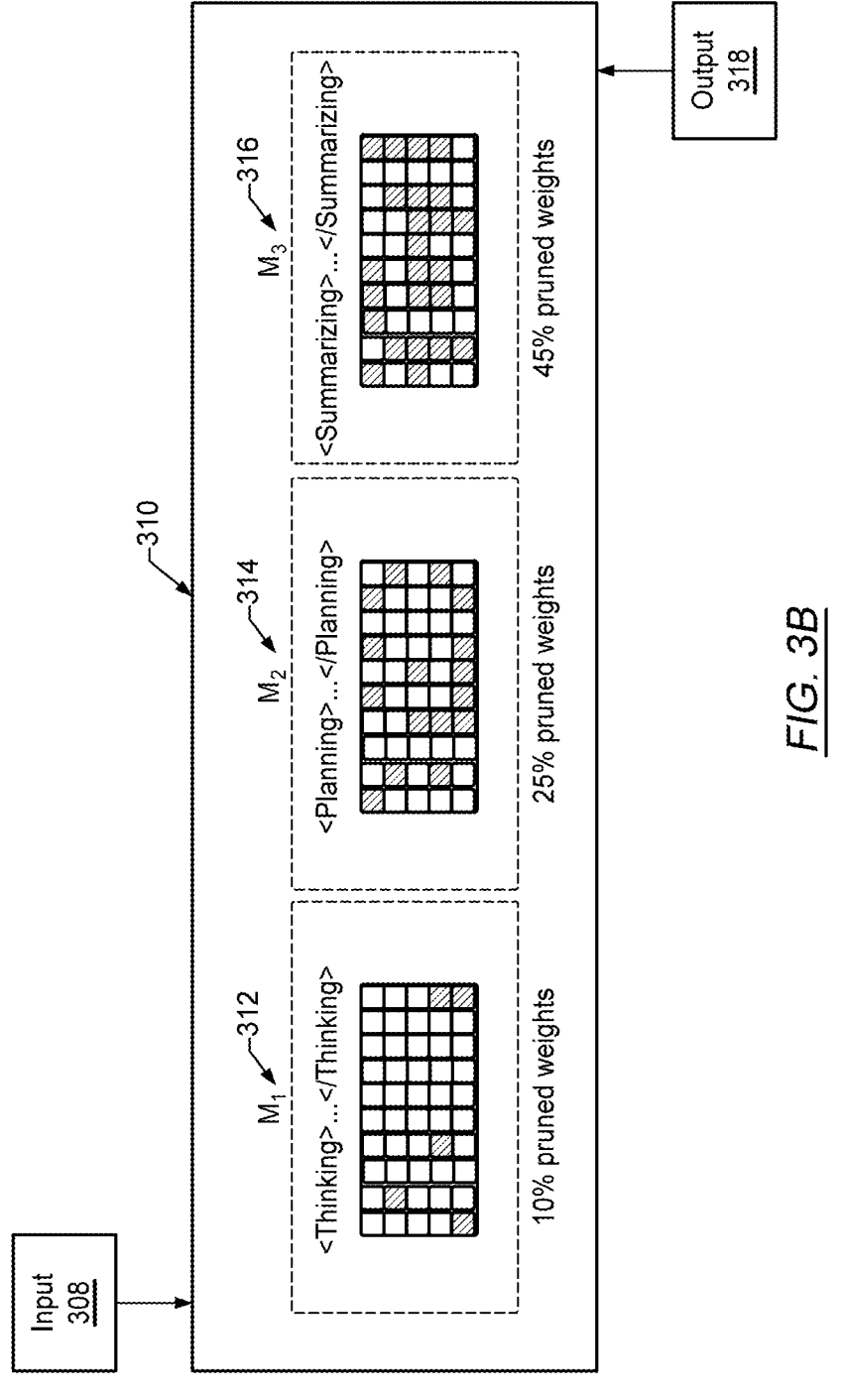

In an embodiment, such as described with respect to FIG. 2A, the modified language model has a higher computational efficiency than the classifier model (see the classifier model (162) in FIG. 1B). Thus, the second computational efficiency is higher than the first computational efficiency. The difference in computational efficiency is caused by the pruning weight mask, which eliminates or reduces a number of the weights being used in the modified language model, relative to the language model (122). Because fewer weights are applied in the attention heads of the modified language model (relative to the language model (122)) (see e.g., FIG. 1B), the modified language model is more efficient. Accordingly, the computer processor (120) may execute the modified language model more quickly than the computer processor (120). The computer processor (120) may execute the language model (122).

The server (118) also may include a server controller (124). The server controller (124) is software or application specific hardware which, when executed by the computer processor (120), controls and coordinates operation of the software or application specific hardware described herein. Thus, the server controller (124) may control and coordinate execution of the language model, the modified language model, the classifier model (162) of FIG. 1B, the server controller (124), or the training controller (126).

The server (118) also may include a training controller (126). The training controller (126) is software or application specific hardware which, when executed by the computer processor (120), trains one or more machine learning models (e.g., the language model (122) or the classifier model (162) of FIG. 1B). The training controller (126) is described in more detail with respect to FIG. 1B.

The system of FIG. 1 also may include one or more user devices (128), which are computer systems operated by one or more users. The user devices (128) may be considered remote or local. A remote user device is a device operated by a third-party (e.g., an end user of a chatbot) that does not control or operate the system of FIG. 1A. Similarly, the organization that controls the other elements of the system of FIG. 1A may not control or operate the remote user device. Thus, a remote user device may not be considered part of the system of FIG. 1A.

In contrast, a local user device is a device operated under the control of the organization that controls the other components of the system of FIG. 1A. Thus, a local user device may be considered part of the system of FIG. 1A.

The data repository (100) also may store a pruning threshold. The pruning threshold is a number output by the classifier model (162) of FIG. 1B. The pruning threshold is used to determine a specific pruning weight mask (defined below) based on the input (102), as explained with respect to FIG. 2A. Generation of the pruning threshold is described with respect to FIG. 2A and FIG. 2B.

The data repository (100) also stores a predetermined weight mask. The predetermined weight mask is a matrix of values, where each entry in the matrix corresponds to one of the weights associated with the language model (defined below). The values in the predetermined weight mask are not the weights themselves, but rather values that represent how likely a given weight of the language model will contribute substantially to the generation of an output, given input (102). The predetermined weight mask is used in determining the pruning weight mask, as described with respect to FIG. 2A. Generation of the predetermined weight mask is described with respect to FIG. 1B.

The server (118) also may host a classifier model, such as the classifier model (162) of FIG. 1B. The classifier model is a classification machine learning model (e.g., a logistic regression model, a support vector machine, a K-nearest neighbor algorithm, etc.) The input to the classifier model is the input (102). The output of the classifier model is the pruning threshold. Use of the classifier model is described with respect to FIG. 2A.

Attention is now turned to FIG. 1B. FIG. 1B shows the details of the training controller (126) of FIG. 1A. Thus, the training controller (126) in FIG. 1B is the training controller (126) in FIG. 1A.

The training controller (126) is the program that trains the language model (122) and the classifier model (162). The training program implements a training procedure. The training procedure includes iteratively executing the language model and the classifier model together on known, predetermined inputs known as training data (150). The predetermined inputs may be the input (102). Each iteration is the method of FIG. 2B. After each iteration, both the language model and the classifier model (162) are modified using a loss function (described below). The loss function adjusts at least one of the weights of the language model, the predetermined weight mask, and the classifier model (162).

The iterative procedure continues until convergence. Convergence occurs when a combination of the weights of the language model, the predetermined weight mask, and the parameters of the classifier model (162) change by less than a predetermined amount between two or more subsequent iterations of the training procedure. Alternatively, convergence occurs after a predetermined number of iterations of the training process.

In more detail, each example alphanumeric input of the training data (150) is input to an embedding model (152). The embedding model (152) generates an output embedding (154). The output embedding (154) is provided as input to both the language model and the classifier model (162).

The classifier model (162) executes on the output embedding (154) to generate a threshold value, as described with respect to FIG. 2B. The threshold value is applied to a predetermined weight mask to generate a pruning mask (i.e., the pruning weight mask described in FIG. 1A). The pruning weight mask modifies the weights of the attention heads of a multi-head attention module (156) of the language model.

Modification of the weights using the pruning weight mask is described with respect to FIG. 2B.

The remaining layers of the language model then generate an output (158). The output (158) may be a vector data structure (a matrix composed of features and values for the features) that a computer may interpret into the token.

The output (158) is provided to a loss function (160). The loss function (160) compares the output (158) to a known output, or considers the degree of change between the current output (158) and the output of the prior iteration. The loss function (160) is described in further detail below. The output of the loss function (160) is a vector that is used to change the weights of the two models (e.g., the weights of the attention heads of a multi-head attention module (156) of the language model), the weights of the linear layers of the language model, the predetermined weight mask, and the parameters of the classifier model (162). Thus, the language model and the classifier model (162) are trained concurrently, wherein at each iteration the effect that the classifier model (162) has on the language model changes.

As mentioned above, the training process then repeats. Again, the training process continues to repeat until convergence of the ensemble, the language model, and the classifier model (162).

A formal definition of the loss function (160) is now provided. The loss function (160) is a cross-entropy loss. With respect to the language model, the target of the loss function (160) applied to the language model is to minimize a lower perplexity, $\mathcal{L}_{CE}$:

$$\mathcal{L}_{CE}(\theta) = \frac{1}{N} \sum_{j=1}^{N} \log p_\theta(y_j \,|\, x_j) \qquad (1)$$

Definitions of the symbology in equation (1) are provided below after equation (3).

For the portion of the loss function applied to the classifier model (162) (i.e., the pruning loss), the target is to minimize $\mathcal{L}_{prune}$ (and thereby to maximize the number of weights that will be pruned (i.e., set to zero or reduced)). Thus, for the portion of the loss function (160) applied to the classifier model (162), the loss function (160) is defined as:

$$\mathcal{L}_{prune}(\theta, \phi) = \frac{1}{N} \sum_{j=1}^{N} activeFrac_j(\theta, \phi) \qquad (2)$$

Definitions of the symbology in equation (1) are provided below after equation (3).

The loss function (160) is the combination of equation (1) and equation (2). In an embodiment, the loss function (160) is simply the addition of equation (1) to equation (2). However, a tuning constant may be applied to the loss function applied to the classifier model (162). Thus, the loss function (160) is defined as:

$$\mathcal{L}_{total}(\theta, \phi) = \mathcal{L}_{CE} + \alpha \mathcal{L}_{prune} \qquad (3)$$

From equation 3, one can see that minimizing $\mathcal{L}_{CE}$ directly corresponds to reducing perplexity.

The definitions of the terms used in equation (1) and equation (2) are as follows:

1. $x_j$ is the j-th input (e.g., a token)
2. $y_j$ is the label (e.g., next token)
3. N is the number of training samples
4. $\theta$ is the parameters of the network
5. $P_\theta(y_j|x_j)$ is the probability of the correct label/token $y_j$, as predicted by the language model with parameters $\theta$.

Additional details of the training process described above are now presented.

Let $m_i$ be the movement score for parameter i. One or more embodiments create a binary mask $m_j$, for the j-th input, whose i-th component is:

$$M_{j,i} = \begin{cases} 1, & \text{if } m_i \geq T_j, \\ 0, & \text{otherwise.} \end{cases} \qquad (4)$$

Hence, weights with $m_i < T_j$ are pruned for the j-th input. The fraction of pruned weights for the j-th input is:

$$activeFrac_j(\theta, \phi) = \frac{\sum_{i=1}^{|\theta|} 1\{m_i \geq T_j\}}{|\theta|} \qquad (5)$$

Where:

$$prunedFrac_j(\theta, \phi) = \frac{\sum_{i=1}^{|\theta|} 1\{m_i \geq T_j\}}{|\theta|} \qquad (6)$$

And $$activeFrac_j(\theta, \emptyset) = 1 - prunedFrac_j(\theta, \emptyset) \qquad (7)$$

Where $1\{\bullet\}$ is the indicator function:

$$T_j = G_\emptyset(x_j) \qquad (8)$$

where $T_j$ is the threshold (or fraction) that determines which weights are pruned; for example, j. Thus, the training process prunes as many weights as possible, while yet maintaining as high of an accuracy as possible. Stated differently, the training procedure described with respect to FIG. 1B balances the ensemble of the language model and the classifier model (162), such that the maximum number of weights of the language model may be pruned using the pruning weight mask, while concurrently minimizing degradation of the accuracy of the language model.

Using the formal terms above, the training method may be performed as follows. Initially, a training input is received. Then, the training controller iterates a training process until convergence. The training process includes executing a classifier model (162) on the training input to generate an intermediate pruning threshold. The training process also includes generating, using the intermediate pruning threshold and a predetermined weight mask, an intermediate pruning weight mask. The training process also includes modifying, using the intermediate pruning weight mask, a language model to generate an intermediate modified language model. Using the intermediate pruning weight mask reduces at least one of a number of weights of the language model defined by the predetermined weight mask.

The training process also includes executing the intermediate modified language model on the training input to generate an intermediate output. The training process also includes determining an intermediate computational efficiency of the intermediate modified language model when generating the intermediate output. The training process also includes determining an intermediate accuracy of the intermediate modified language model when generating the intermediate output.

The training process also includes determining whether a combination of the intermediate computational efficiency and the intermediate accuracy satisfies an optimization value. In an embodiment, the optimization value is satisfied when the loss function reaches a maximum. In another embodiment, the optimization value may be a difference between prior computational efficiency in the iterative training process and a current computational efficiency in the iterative process. If the difference is zero (or some other predefined number), then the language model and the classification model may be considered to have reached optimum performance. Alternatively, the optimization value may be a predetermined threshold number that indicates when the training process is considered completed.

In any case, during the training process, the cross entropy loss term is changed, during the training process, to minimize a perplexity of the language model. Additionally, during the training process, the pruning loss term and the tuning constant are changed, to minimize a number of weights used by the language model.

The training process also includes generating, responsive to determining that the combination fails to satisfy the optimization value, a loss function. The loss function is generated according to the definitions provided above. The training process also includes applying the loss function to both the classifier model (162) and the language model to generate an intermediate classifier model (162) and an intermediate language model.

Convergence occurs when the optimization value is satisfied. Upon convergence, the intermediate language model is a trained language model and the intermediate classifier model (162) is a trained classifier model (162). The trained language model and the trained classifier model (162) are returned (e.g., deployed for production, stored for future use, etc.).

In an embodiment, as shown in the formal definitions above, the loss function may be a combination of a cross entropy loss term applicable to the language model and a pruning loss term applicable to the classification model. In an embodiment, the loss function also may include a tuning constant applied to the pruning loss term.

While FIG. 1A and FIG. 1B show a configuration of components, other configurations may be used without departing from the scope of one or more embodiments. For example, various components may be combined to create a single component. As another example, the functionality performed by a single component may be performed by two or more components.

FIG. 2A shows a flowchart of a method for increasing the computational efficiency of executing a language model, in accordance with one or more embodiments. The method of FIG. 2A may be implemented using the system of FIG. 1A and one or more of the steps may be performed on or received at one or more computer processors. The method of FIG. 2A may be referred to as a dynamic process because the process of determining which model weights to deactivate (by setting to zero) depends on either a boundary token generated by a reasoning language model, on the original input to the language model, or both. Because the input may change, the modified model generated as described below may be different for each different input.

Step 200 includes receiving an input to a language model having an initial computational efficiency. The input may be received from a user device, or may be received from an automated process executing on a server that also executes the method of FIG. 2A. The input may be received in the form of a prompt.

Step 202 includes processing the language model on the input. Processing the language model includes executing the language model on a processor, which takes the input prompt as described above. Step 202 involves initiating processing of the language model, as opposed to completing execution of the language model on the output, because steps 202 through 212 below are performed during the processing of the language model.

Step 204 includes receiving, during processing, a first boundary token output by the language model during a selected execution phase of the language model. The first boundary token is received by the server controller when the language model outputs the first boundary token. The first boundary token may be received when the first processing stage of a reasoning language model is initiated. However, the "first" boundary token also may be received when a subsequent processing stage of the reasoning language model is initiated. In other words, the "first" boundary token is a term that relates to a position in time relative to the "second" boundary token, rather than relating to the very first boundary token generated by the language model.

In a variation, step 204 (or an additional prior step) may include executing, prior to receiving the first boundary token, a classifier model on the input to output a pruning threshold. In this case, the method also may include generating a designated pruning weight mask according to the pruning threshold. The designated pruning weight mask may be used as described with respect to step 206.

Step 206 includes modifying, prior to the selected execution phase, the language model with a designated pruning weight mask. The designated pruning weight mask applies to the language model during the selected execution phase.

Modifying may be performed by combining (e.g., multiplying) the designated pruning weight mask by the parameters of the machine learning model. Thus, the parameters of the language model may be modified selectively according to which entries in the designated pruning weight mask are set to zero (or a reduced value).

Modifying the language model with the designated pruning weight mask may be performed responsive to receiving the first boundary token. In other words, when the first boundary token is received, the designated pruning weight mask may be applied to the parameters language model. The designated pruning weight mask therefore may apply during the pendency of the current execution phase of the reasoning language model (where the initiation of the current execution phase was signaled by receiving the first boundary token).

In an embodiment, the designated pruning weight mask modifies the language model only during the selected execution phase. Thus, once a new execution phase is reached, the designated pruning weight mask will no longer modify the parameters of the language model. Once the processor completes execution of the various execution phases of the language model, the designated pruning weight mask also no longer applies to the language model.

In an embodiment, step 206 also may include, as part of the step 206 or as a preceding step, generating the designated pruning weight mask. Thus, for example, the designated pruning weight mask may be generated prior to processing the language model at step 202. The designated pruning weight mask also may be generated during the method of FIG. 2A, prior to step 206, as described for example with respect to step 204.

Step 208 includes receiving, while processing, a second boundary token output by the language model during a subsequent execution phase of the language model, after the selected execution phase. Receiving the second boundary token may be performed in a manner similar to receiving the first boundary token at step 204. However, at step 208, the boundary token received is received subsequent to receiving the first boundary token. In other words, when step 208 occurs, the reasoning language model has advanced to the next (or some other future) execution stage of the reasoning language model.

Step 210 includes modifying, prior to the subsequent execution phase, the language model with a successive pruning weight mask. The successive pruning weight mask is different than the designated pruning weight mask. The successive pruning weight mask applies to the language model during the subsequent execution phase. At least one of the designated pruning weight mask and the successive pruning weight mask modifies the language model to a modified language model including a final computational efficiency greater than the initial computational efficiency. In an embodiment, the successive weight mask may deactivate more (or fewer) of the parameters relative to those deactivated by the designated pruning weight mask.

In an embodiment, modifying the language model with the successive pruning weight mask may be performed responsive to receiving the second boundary token, in a manner similar to that described above. Similarly, the successive pruning weight mask modifies the language model only during the subsequent execution phase, in a manner similar to that described above.

In any case, using either the designated pruning weight mask or the successive pruning weight mask modifies the language model by modifying the weights. Thus, in case of using either or both pruning weight masks, the modified language model uses fewer execution cycles of a computer processor to process the input, relative to a number of execution cycles of the computer processor used by the language model to process the input prior to modifying the language model. Accordingly, step 206 or step 210, or both, accomplish a technical result of increasing the computational efficiency of the modified language model.

Step 210 may be further modified by adding additional steps or modified steps prior to, or during, Step 210. For example, the method may include executing, prior to receiving the second boundary token, a classifier model on the input to output a second pruning threshold. In this case, the method also may include generating the successive pruning weight mask according to the second pruning threshold, in a manner similar to that described with respect to generating the designated pruning weight mask. Similarly, the method also may include generating the successive pruning weight mask prior to processing the language model, in a manner similar to that described with respect to generating the designated pruning weight mask.

Step 212 includes generating, during the selected execution phase with the designated pruning weight mask and during the subsequent execution phase with the successive pruning weight mask, a number of tokens. In other words, the combination of the selected execution phase and the subsequent execution phase of the language model generates the number of tokens. Additional tokens also may be generated during other execution phases of the language model. Thus, the number of number of tokens may be more than the tokens returned during just the selected execution phase and the subsequent execution phase.

In any case, generation of the number of tokens is accomplished by the language model predicting each of the tokens one at a time. Thus, based on prior tokens generated (if any) and further based on the input prompt, the language model predicts a next token. The process of token prediction continues until a last token is generated (i.e., the language model predicts that the current token is the final token to be generated by the language model, and thereafter execution of the language model terminates).

Step 214 includes returning the number of tokens. The tokens may be returned by storing the tokens, displaying the tokens on a display device, transmitting the tokens to a user device, providing the tokens to a software process that called for the generation of the tokens, etc.

The method of FIG. 2A may be varied. The method may include more, fewer, or altered steps. For example, the method also may include tracking a gradient movement between the designated pruning weight mask and the successive pruning weight mask. Tracking the gradient movement involves determining a percentage change between deactivated (or activated or modified) weights between the two pruning weight masks. The percentage change may be the gradient movement. In this example, the method also may include identifying, according to the gradient movement, a parameter of the language model to be modified by at least one of the designated pruning weight mask and the successive pruning weight mask. In other words, one or more parameters of the language model may be further modified according to the gradient movement, and not just the pruning weight mask itself.

In an embodiment, the designated pruning weight mask or the successive pruning weight mask includes a number of pruning values corresponding to a number of weights of the language model. In this case, the method also may include comparing the pruning threshold to each of the number of pruning values to identify a subset of the number of pruning values that satisfy the pruning threshold. Then, the method includes identifying a subset of the number of weights corresponding to the subset of the number of pruning values. Then, the method includes modifying the designated weight mask or the successive weight mask by identifying a number of reduction values for the subset of the number of weights. Each of the number of reduction values may include zero such that, when the pruning weight mask is applied to the number of weights, each of the subset of the number of weights of the language model is set to zero.

Viewing FIG. 2A as a whole, the method of FIG. 2A may be referred to as capability aware pruning. The capability aware pruning method may assign different pruning masks to different capabilities by leveraging special tags during training (e.g., <Thinking> . . . </Thinking>, <Planning> . . . </Planning>, <Summarizing> . . . </Summarizing>). When a capability is "active," one or more embodiments may analyze the movement of gradients during that tagged portion of the training process and derive a pruning mask specific to that capability. In so doing, one or more embodiments may help ensure that pruning is focused on the weights that are less relevant to a given capability, while preserving those most useful to the capability, leading to better overall performance when multiple capabilities coexist within a single large language model.

The following is a summarized flow of the training process. The first step is capability identification. During the training process, each capability is wrapped with boundary tags (e.g., <Thinking>, <Planning>, <Summarizing>) generated by the large language model. These tags are used to determine which capability is currently active.

The second step is pruning weight analysis. For each capability's tagged segment, one or more embodiments utilize the gradient movement following a movement pruning approach. The absolute movement of the weights is recorded to identify useful vs. less useful parameters of the language model. Note that other pruning techniques could be also utilized.

The third step is capability specific pruning mask generation. Based on the gradient movement for each capability, a unique pruning mask may be created. The approach helps ensure that weights useful for a particular capability remain unpruned, thereby enabling the language model to retain optimal functionality for that capability.

During inference or fine-tuning, the appropriate pruning mask is applied depending on the capability used by the user or by the model's internal decision. By selectively applying the masks, the model dynamically preserves the weights most useful for the active capability (independently of the inputs).

One or more embodiments provide for tagged capability identification. One or more embodiments also provide for identifying and isolating capabilities within a large language model (via tags) for the purpose of selectively retaining or pruning weights. One or more embodiments also provide for a capability specific mask, whereas existing pruning methods generally produce a single global mask. Thus, one or more embodiments may produce multiple, capability-specific masks, constituting a useful pruning paradigm that recognizes and preserves weights essential to each distinct capability.

FIG. 2B shows a flowchart of a method for training a language model, in accordance with one or more embodiments. The method of FIG. 2B may be used to train a language model to be used in the method of FIG. 2A. The method of FIG. 2B may begin after receiving a training input (i.e., training data, as described with respect to FIG. 1B). Then, a process may iterate until convergence. The process includes the following steps.

Step 300 includes executing a classifier model on the training input to generate an intermediate pruning threshold. The classifier model is executed by a computer processor on the training input. The output is an intermediate pruning threshold (i.e., the classifier model is trained to predict what the pruning threshold should be based on the input).

Step 302 includes generating, using the intermediate pruning threshold and a predetermined weight mask, an intermediate designated pruning weight mask and an intermediate successive pruning weight mask. The intermediate successive pruning weight mask may be generated by modifying the predetermined weight mask. For example, the predetermined weight mask may be all "1s," and then modified to certain cells being zero depending on the value of the intermediate pruning threshold. For example, each cell in the mask may be associated with a pruning value which is compared to the intermediate pruning threshold. If the pruning value for a given cell is less than the intermediate pruning threshold, then that cell in the intermediate pruning mask is set to zero (or reduced).

Step 304 includes modifying, using the intermediate pruning weight mask and during a first execution phase of the language model, a language model. As described above, the intermediate pruning weight mask may be multiplied by a matrix defining the parameters of the language model. As a result, the parameters of the language model are modified according to the values in the intermediate pruning weight mask. Therefore, using the intermediate pruning weight mask reduces at least one of a number of weights of the language model defined by the predetermined weight mask.

Step 306 includes modifying, using the intermediate pruning weight mask and during a second execution phase of the language model. In other words, the language model generates tokens during the second execution phase of the model using the modified weights (as modified by the intermediate pruning weight mask). Accordingly, using the intermediate pruning weight mask reduces at least one of the number of weights. Modifying the language model during the first execution phase and the second execution phase generates an intermediate modified language model (because changing the parameters of the language model effectively modifies the language model).

Step 308 includes executing the intermediate modified language model on the training input to generate an intermediate output. The tokens generated by the intermediate modified language model is the intermediate output.

Step 310 includes determining an intermediate computational efficiency of the intermediate modified language model when generating the intermediate output. The intermediate computational efficiency may be determined by counting the number of processor cycles used to generate the intermediate output. Alternatively, the computational efficiency may be estimated by determining a relative percentage of deactivated parameters compared to the total possible number of parameters that the language model could have used to generate the intermediate output. Other measurements for computational efficiency exist.

Step 312 includes determining an intermediate accuracy of the intermediate modified language model when generating the intermediate output. The intermediate accuracy may be estimated by comparing the intermediate output to a ground truth (i.e., a preexisting output known to be correct). The intermediate accuracy also may be estimated by comparing the intermediate output to the output of the language model when all (or more) parameters of the language model are used to generate the output. In this case, the output of the language model using all (or more) parameters may be assumed to be a more accurate representation. Thus, when the two outputs are compared (the intermediate output and the more complete output) using, for example, a semantic similarity analysis, a measurement may be determined for the intermediate accuracy of the intermediate modified language model.

Step 314 includes determining whether a combination of the intermediate computational efficiency and the intermediate accuracy satisfies an optimization value. The optimization value may be predetermined. The optimization value may be a compound number. For example, a target may be set that the computational efficiency should meet or exceed a 10% improvement in speed and the accuracy should meet or exceed 95% accuracy. Alternatively, the efficiency and accuracy may be hashed, and the hashed number compared to a single optimization value.

Step 316 includes generating, responsive to determining that the combination fails to satisfy the optimization value, a loss function. Generation of the loss function is described with respect to FIG. 1B.

Step 318 includes applying the loss function to both the classifier model and the language model to generate an intermediate classifier model and an intermediate language model. Application of the loss function is described with respect to FIG. 1B. However, briefly, processing the loss function on the language model changes the parameters of the language model, thereby changing the language model. Unlike a pruning weight mask, the loss function permanently changes the weights of the language model, at least until the next iteration of the method of FIG. 3A.

In an embodiment, the loss function includes a combination of a cross entropy loss term applicable to the language model and a pruning loss term applicable to the classification model. The loss function further may include a tuning constant applied to the pruning loss term. The optimization value may be satisfied when the loss function reaches a maximum. The cross entropy loss term may be changed, during the process, to minimize a perplexity of the language model. The pruning loss term and the tuning constant are changed, during the process, to minimize a number of weights used by the language model.

Step 320 includes determining whether convergence occurs. Convergence occurs once a stop condition of training is satisfied, as described with respect to FIG. 1B. For example, convergence may occur when the optimization value is satisfied. Convergence also could occur upon a predetermined number of iterations of the method of FIG. 3. Upon convergence, the intermediate language model is a trained language model and the intermediate classifier model is a trained classifier model, and the process terminates.

If convergence does not occur, then the method returns step 300. The method of FIG. 3 then repeats.

Variations to FIG. 2A, FIG. 2B, FIG. 3A, and FIG. 3B are possible. For example, the method also may include receiving an input to a language model having a first computational efficiency. The input may be received from a user device, a computer process, or retrieved from a data repository containing inputs. In any case, the input is received by the computer processor and is intended for execution by the language model.

The method also may include determining, from the input, a pruning threshold. Determining the pruning threshold may include executing a classifier model on the input to output the pruning threshold. The classification model is trained as described with respect to FIG. 1B.

In an alternative embodiment, the pruning threshold may be a number output by some rule or policy, or which is predetermined. Thus, the pruning threshold need not necessarily be an output of the classification model.

The method also may include determining a pruning weight mask for the input from a combination of the pruning threshold and a predetermined weight mask defined for the language model. As described with respect to FIG. 1A, the predetermined weight mask is a number of pruning values corresponding to the number of weights. Thus, when the pruning threshold is output by the classification model, the server controller compares the pruning threshold to each of the number of pruning values in the predetermined weight mask. As a result of the comparison, the server controller identifies a subset of the number of pruning values (of the predetermined weight mask) that satisfy the pruning threshold.

In an embodiment, the server controller then identifies a subset of the number of weights (of the predetermined weight mask) corresponding to the subset of the number of pruning values which satisfied the pruning threshold output by the classification model. The server controller then sets to zero (or reduces) the weights of the language model that correspond to the number of pruning values. Stated differently, determining the pruning weight mask includes modifying the predetermined weight mask by identifying the number of reduction values for the subset of the number of weights. The reduction values are either zero (i.e., the number zero is multiplied by the weight of the language model) or a number less than one (i.e., a fraction less than one is multiplied by the weight of the language model). The remaining weights of the language model are not altered by the pruning weight mask.

In other words, each of the number of reduction values may be zero such that, when the pruning weight mask is applied to the number of weights, each subset of the number of weights of the language model is set to zero. However, if the reduction value is between zero and one, then modifying the number of weights is performed according to the pruning weight mask by reducing each subset of the number of weights by the reduction value.

The method also may include modifying, using the pruning weight mask, the language model to generate a modified language model having a second computational efficiency greater than the first computational efficiency. Specifically, the language model is modified by multiplying the weights of the language model that correspond to the subset of the pruning weight mask which satisfied the pruning threshold. As a result, the modified language model includes a number of weights whose values are reduced to zero or are reduced. Thus, modifying the language model causes the language model to use fewer execution cycles of a computer processor to process the input, relative to a number of execution cycles of the computer processor used by the language model to process the input prior to modifying the language model.

The method also may include executing the modified language model on the input to generate a token. The original input is provided as input to the modified language model. The output of the modified language model is a token. Again, a token is a word, phrase, paragraph, multiple paragraphs, one or more numbers, etc.

The method also may include returning the token. The token may be returned by storing the token in a data repository. The token may be returned by transmitting the token to a display device of a user device. The token may be returned by providing the token to some other automated process that called the language model to process the input.

Again, the methods of FIG. 2A and FIG. 2B may be a dynamic pruning process. Changing the input may change the pruning threshold, as described above. Changing the pruning threshold changes the pruning weight mask, as described above. Changing the pruning weight mask generates a differently modified model, as described above. Changing the model, in turn, may change the efficiency with which the modified model is executed when the input is provided to the modified model. Thus, again, the methods of FIG. 2A and FIG. 2B may be referred to as a dynamic process.

The methods of FIG. 2A and FIG. 2B may be modified by adding steps, removing steps, or modifying the steps described. In an example, the methods of FIG. 2A or FIG. 2B also may include generating the predetermined weight mask defined for the language model. The predetermined weight mask may be determined during training of the ensemble of the language model and the classification model. The predetermined weight mask also may be determined by some other process, or may be generated by a computer scientist.

In another example, the method of FIG. 2A may include training the language model and the classification model. Again, the training process is described with respect to FIG. 1B or FIG. 2B.

While the various steps in the flowcharts of FIG. 2A and FIG. 2B are presented and described sequentially, at least some of the steps may be executed in different orders, may be combined or omitted, and at least some of the steps may be executed in parallel. Furthermore, the steps may be performed actively or passively.

FIG. 3A and FIG. 3B show an example of an in-use example of a method for increasing the computational efficiency of executing a language model, in accordance with one or more embodiments. The following example is for explanatory purposes only and not intended to limit the scope of one or more embodiments.

FIG. 3A shows a training phase of the language model with different pruning weight masks used at each execution phase. Specifically, FIG. 3A shows the effects of training a reasoning language model using the method of FIG. 2B. Training process (300) proceeds in a number of steps, with each step being one iteration of the method of FIG. 2B. For brevity, only three steps out of "N" total steps are shown, but one or more embodiments contemplate that step 1 is followed by 999 other steps until step 1,000 is reached, and then some number of additional steps (e.g., 5,000) occur until Step N is reached.

The three execution phases are "thinking," "planning," and "summarizing." Each execution phase is indicated by a boundary token. The "Thinking" phase boundary tokens include "<Thinking>," which is the boundary token that indicates the beginning of the initial execution phase (i.e., the "Thinking" execution phase), and "</Thinking>," which is the boundary token that indicates the termination of the "Thinking" execution phase. Similarly, the "Planning" phase boundary tokens include "<Planning>," which is the boundary token that indicates the beginning of the second execution phase (i.e., the "Planning" execution phase), and "</Planning>," which is the boundary token that indicates the termination of the "Planning" execution phase. Likewise, The "Summarizing" phase boundary tokens include "<Summarizing>," which is the boundary token that indicates the beginning of the last execution phase (i.e., the "Summarizing" execution phase), and "</Summarizing>," which is the boundary token that indicates the termination of the "Summarizing" execution phase. At each step, the sum of tokens generated at the end of the "Summarizing" execution phase is the output of the intermediate model, which is used to generate the loss function and further modify the intermediate model, as described in FIG. 2B above.

At each step, each execution phase has an associated different pruning weight mask. For example, at step 1,000, pruning weight mask M1 (302) applies during the "thinking" execution phase, pruning weight mask M2 (304) applies during the "planning" execution phase, and pruning weight mask M3 (306) applies during the "summarizing" execution phase. In each pruning weight mask, a darker square indicates a that a corresponding parameter of the language model will be multiplied by 1 (i.e., not changed) and a lighter square indicates a corresponding parameter of the language model will be multiplied by 0 (i.e., effectively turned off).

Thus, as shown in the example, training resulted in an empirical determination that more parameters may be active in the "thinking" phase, fewer parameters may be active in the "planning" phase, and fewer parameters yet may be active in the "summarizing" phase, without adversely affecting the measured accuracy of the tokens output by the language model at each stage. The measured accuracy is measured relative to the predetermined accuracy, as described above. Thus, each pruning weight mask is customized to each corresponding execution phase of the language model.

Training also may determine which specific weights of the language model should be pruned (i.e., set to zero) using the corresponding pruning weight mask at a corresponding executing phase. Thus, for example, the lighter boxes at pruning weight mask M1 (312) may be selected specifically because certain weights of the language model may be less important than others for a given type of input to be processed by the language model. Again, selection of which weights to prune (i.e., set to zero by way of a given pruning weight mask at a given execution phase) is performed by "guessing" at weights to prune at each training step, checking the result at each training step, generating a loss function with the result at each training step, and then continuing training until both the number and identities of the weights to be pruned by way of the corresponding pruning weight mask are known.

The pattern of changing pruning weight masks for each execution phase continues during training until Step N. At Step N, each of the three pruning weight masks is no longer changing, or changes less than some predetermined amount, relative to step N–1 (the immediately previous step) or relative to some number of previous steps. The pruning weight masks may not change because, for example, further pruning (i.e., setting more of the weights to zero) would reduce the accuracy of the tokens generated by the language model at the corresponding execution phase. Accordingly, at Step N, convergence is reached.

FIG. 3B shows an inference phase of the language model with different pruning weight masks used at each execution phase, as opposed to the training phase of the language model as described with respect to FIG. 3A. During inference, the language model is being used to make predictions of interest.

In the example of FIG. 3B, an input (308) in the form of a prompt is received at a reasoning language model (310). The reasoning language model (310) is commanded to execute on the prompt. The input may be, for example, "please analyze the following paper, summarize the paper, and also correct the paper of any grammatical errors." The paper, or a link to the paper, is included in the prompt.

The reasoning language model (310) initiates a first phase of execution, which is a thinking phase. The reasoning language model (310) generates an initial boundary token during the thinking phase, represented by the text <thinking>. In response, the reasoning language model (310) applies the pruning weight mask M1 (312) to the weights of the reasoning language model (310). Because training (in FIG. 3A) determined that the language model (310) uses more weights in order to generate an accurate answer for the kind of the input (308) provided, the pruning weight mask M1 (312) negates (i.e., prunes) only 10% of the weights of the pruning weight mask M1 (312).

During the thinking phase, the reasoning language model (310) generates ten tokens. In other examples, the reasoning language model (310) may output more or fewer tokens. After ten tokens, the reasoning language model (310) outputs a terminal boundary token (i.e., </Thinking>). Thus, the reasoning language model (310) moves to the next execution phase. Execution of the reasoning language model (310) is more computationally efficient because fewer weights are calculated during execution.

The reasoning language model (310) indicates the initiation of the next execution phase, the planning phase, with the boundary token labeled <Planning>. In response, the reasoning language model (310) applies the pruning weight mask M2 (314) to the weights of the reasoning language model (310). Because training (in FIG. 3A) determined that the reasoning language model (310) uses fewer weights, relative to the thinking phase, to generate an accurate answer, the pruning weight mask M2 (314) negates (i.e., prunes) 25% of the weights of the reasoning language model (310). Execution of the reasoning language model (310) is more computationally efficient because fewer weights are calculated during execution.

During the planning phase, the reasoning language model (310) generates five tokens. In other examples, the reasoning language model (310) may output more or fewer tokens. After five tokens, the reasoning language model (310) outputs a terminal boundary token (i.e., </Planning>). Thus, the reasoning language model (310) moves to the next execution phase.

The reasoning language model (310) indicates the initiation of the next execution phase, the summarization phase, with the boundary token labeled <Summarizing>. In response, the reasoning language model (310) applies the pruning weight mask M3 (316) to the weights of the reasoning language model (310). Because training (in FIG. 3A) determined that the reasoning language model (310) uses fewer weights, relative to the planning phase, to generate an accurate answer, the pruning weight mask M3 (316) negates (i.e., prunes) 45% of the weights of the reasoning language model (310). Execution of the reasoning language model (310) is more computationally efficient because fewer weights are calculated during execution.

During the planning phase, the reasoning language model (310) generates 100 tokens. In other examples, the reasoning language model (310) may output more or fewer tokens. After 100 tokens, the reasoning language model (310) outputs a terminal boundary token (i.e., </Summarizing>). Because the language model has no further execution phases in the example, the reasoning language model (310) terminates execution. Some or all of the tokens from all three phases may be returned to a user, stored, passed to another software process, etc. For example, the ten tokens from the thinking phase, the five tokens from the planning phase, or the 100 tokens from the summarization phase may be returned (or all 115 tokens may be returned). Whichever tokens are returned form the output (318) of the reasoning language model (310).

The computational efficiency of the reasoning language model (310) is increased by the operation of one or more embodiments. Thus, fewer computational resources may be used to execute the reasoning language model (310), the reasoning language model (310) may be executed in less time, or both (the improvements are relative to use of a language model without using one or more embodiments). Furthermore, one or more embodiments permit the optimization of the computational efficiency of the model within an acceptable loss in accuracy, because the pruning weight masks are determined for each execution phase of the language model.

Figure 3C:
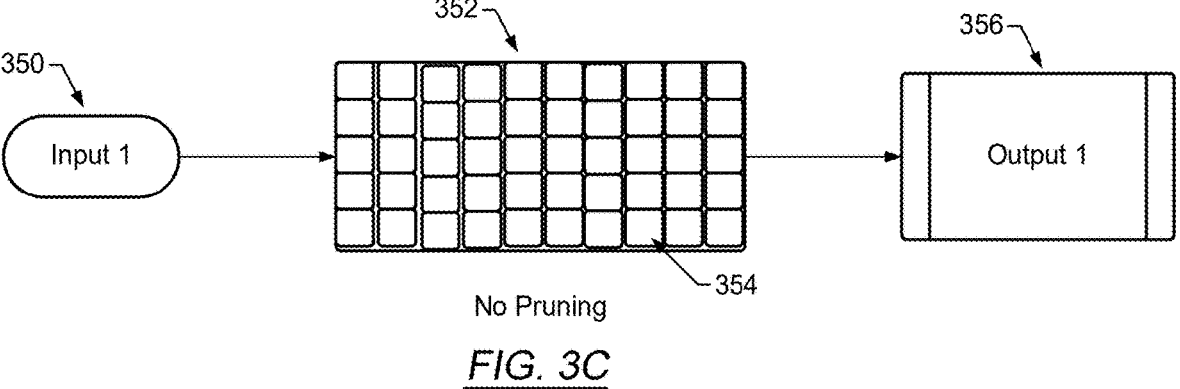
FIG. 3C, FIG. 3D, FIG. 3E, and FIG. 3F show examples of static weight pruning in a language model.
Figure 3D:
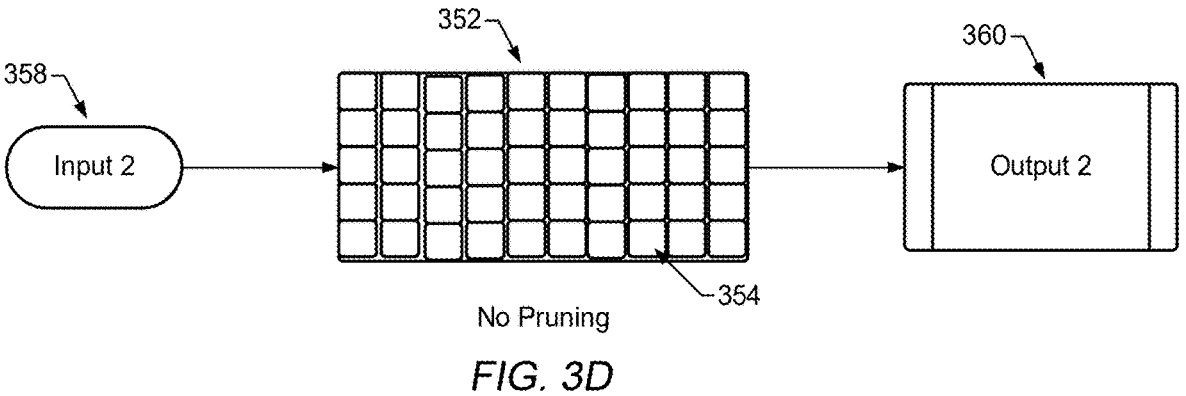
Figure 3E:
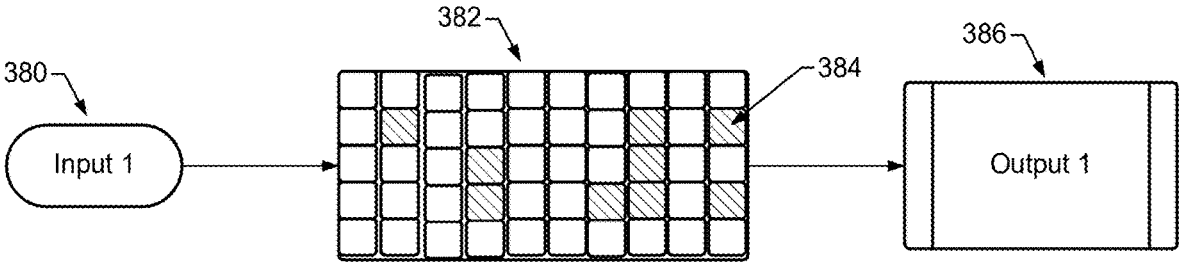
Figure 3F:
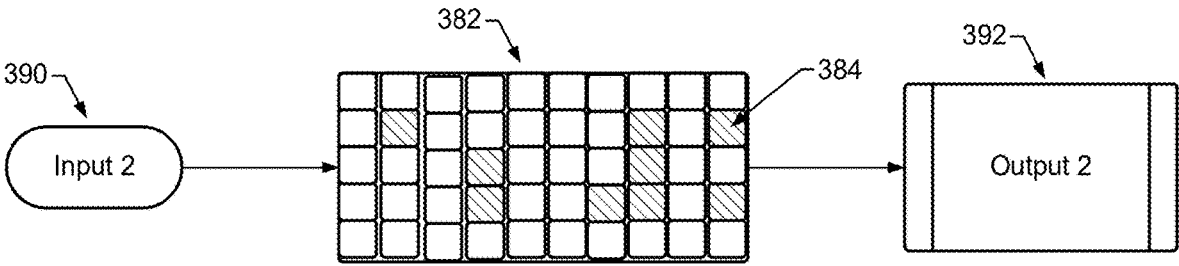

To highlight the differences between one or more embodiments and other language model processing techniques, attention is turned to FIG. 3C, FIG. 3D, FIG. 3E, and FIG. 3F. FIG. 3C through FIG. 3F show examples of static weight pruning in a language model, without using the flexible and efficient approach of one or more embodiments. FIG. 3C and FIG. 3D should be considered together. FIG. 3E and FIG. 3F should be considered together.

In FIG. 3C and FIG. 3D, no pruning is performed. In FIG. 3C, a first input (350) is provided to language model (352). The language model includes a matrix of weights, shown as cells (e.g., cell (354) in the language model (352). All of the weights are used when the language model (352) executes on the first input (350). The result is a first output (356), which is returned. However, because all weights are used when executing the language model (352), no computational efficiency is achieved.

Similarly, on FIG. 3D, a second input (358) is provided to language model (352). The language model includes the same matrix of weights in FIG. 3C, shown as cells (e.g., cell (354) in the language model (352)). All of the weights are used when the language model (352) executes on the second input (358). The result is a second output (360), which is returned. However, because all weights are used when executing the language model (352), no computational efficiency is achieved.

Furthermore, even though the first input (350) could be computed with fewer weights than the second input (352) with little or no loss in accuracy, nevertheless all weights are used in both cases. Thus, no increase in computational efficiency is achieved when processing one input relative to the other.

In FIG. 3E and FIG. 3F, a static pruning technique is applied to the model. As used herein, the term "static pruning" means that the weights of the language model are pruned without regard to the input.

Thus, in FIG. 3E, first input (380) is provided to a language model (382). A predetermined number of weights have been modified, as determined by a training process. Thus, for example, the weight in cell (384) (and the other cells indicated by hash marks) has been modified. As a result, a greater computational efficiency is achieved when the modified language model processes the first input (380) to generate a first output (386).

In FIG. 3F, a second input (390) is provided to the language model (382). However, the same scheme for modifying the weights of the language model (382) was applied to the language model (382). Thus, for example, the same weights (e.g., cell (384)) as in FIG. 3E were modified. The language model (382) generates output 2 (392).

As with the example of FIG. 3C and FIG. 3D, the first input (390) could be computed with fewer weights than the second input (392) with little or no loss in accuracy; nevertheless, the same modified weights are used in both cases. Thus, there is no increase in computational efficiency in executing the language model (382) on the first input (380) relative to the second input (390), even though the first output (386) theoretically could have been computed with greater efficiency than the second output (392).

However, the different and improved computational efficiencies of processing the two inputs are achieved in the examples of FIG. 3A and FIG. 3B, which again are examples of the method of FIG. 2A and FIG. 2B. Thus, the prior art methods of FIG. 3C through FIG. 3F highlight the improved computational efficiency of one or more embodiments.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 4A:
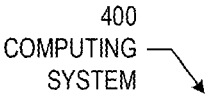
FIG. 4A and FIG. 4B show a computing system and network environment, in accordance with one or more embodiments.
Figure 4A:
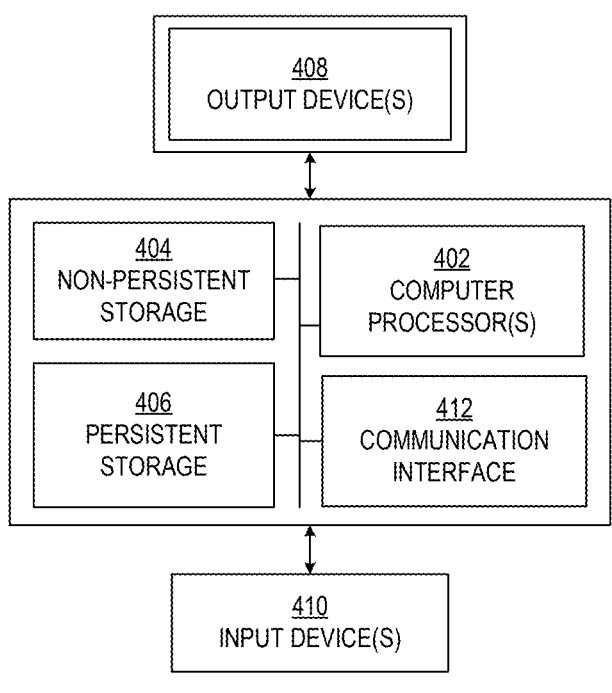

For example, as shown in FIG. 4A, the computing system (400) may include one or more computer processor(s) (402), non-persistent storage device(s) (404), persistent storage device(s) (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) (402) may be one or more cores, or micro-cores, of a processor. The computer processor(s) (402) includes one or more processors. The computer processor(s)

(402) may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (412). The inputs may include text input, audio input, video input, etc., which may be processed and transmitted by the computing system (400) in accordance with one or more embodiments. The communication interface (408) may include an integrated circuit for connecting the computing system (400) to a network (not shown) (e.g., a local area network (LAN), a wide area network (WAN) such as the Internet, mobile network, or any other type of network) or to another device, such as another computing device, and combinations thereof.

Further, the output device(s) (412) may include a display device, a printer, external storage, or any other output device. One or more of the output device(s) (412) may be the same or different from the input device(s) (410). The input device(s) (410) and output device(s) (412) may be locally or remotely connected to the computer processor(s) (402). Many different types of computing systems exist, and the aforementioned input device(s) (410) and output device(s) (412) may take other forms. The output device(s) (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

Figure 4B:
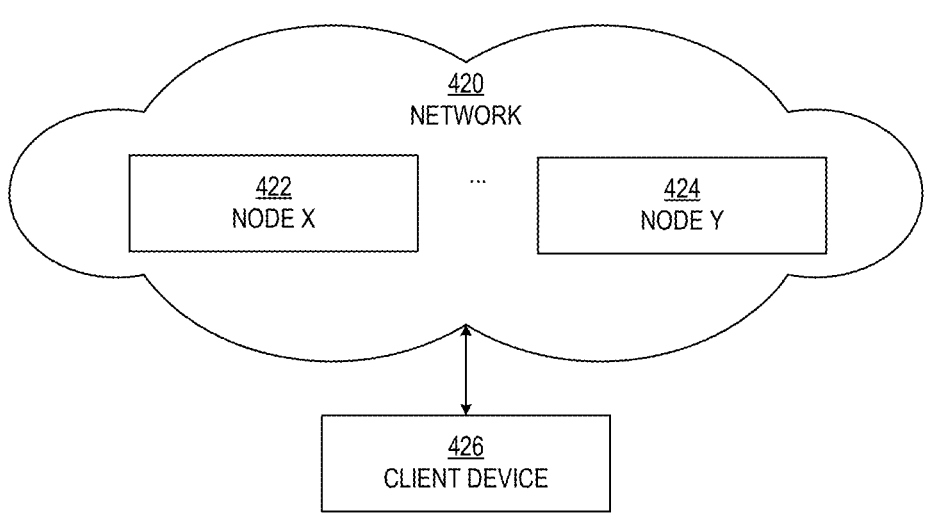

The computing system (400) in FIG. 4A may be connected to, or be a part of, a network. For example, as shown in FIG. 4B, the network (420) may include multiple nodes (e.g., node X (422) and node Y (424), as well as extant intervening nodes between node X (422) and node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422) and node Y (424)) in the network (420) may be configured to provide services for a client device (426). The services may include receiving requests and transmitting responses to the client device (426). For example, the nodes may be part of a cloud computing system. The client device (426) may be a computing system, such as the computing system shown in FIG. 4A. Further, the client device (426) may include or perform all or a portion of one or more embodiments.

The computing system of FIG. 4A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving an input to a language model having an initial computational efficiency;

processing the language model on the input;

receiving, during processing, a first boundary token output by the language model during a selected execution phase of the language model, wherein:

the first boundary token comprises a first token that the language model uses during execution to indicate that the selected execution phase is finished and that a subsequent execution phase will be initiated, and the selected execution phase comprises a first stage of execution of the language model to perform a first task;

modifying, prior to the selected execution phase, the language model with a designated pruning weight mask, wherein the designated pruning weight mask applies to the language model during the selected execution phase;

receiving, while processing, a second boundary token output by the language model during a subsequent execution phase of the language model, after the selected execution phase, wherein:

the second boundary token comprises a second token that the language model uses during execution to indicate that the subsequent execution phase is finished, and the subsequent execution phase comprises a second stage of execution of the language model to perform a second task, subsequent to the first task;

modifying, prior to the subsequent execution phase, the language model with a successive pruning weight mask, wherein the successive pruning weight mask is different than the designated pruning weight mask, wherein the successive pruning weight mask applies to the language model during the subsequent execution phase, and wherein at least one of the designated pruning weight mask and the successive pruning weight mask modifies the language model to a modified language model comprising a final computational efficiency greater than the initial computational efficiency;

generating, during the selected execution phase with the designated pruning weight mask and during the subsequent execution phase with the successive pruning weight mask, a plurality of tokens; and returning the plurality of tokens.

2. The method of claim 1, further comprising:

tracking a gradient movement between the designated pruning weight mask and the successive pruning weight mask; and identifying, according to the gradient movement, a parameter of the language model to be modified by at least one of the designated pruning weight mask and the successive pruning weight mask.

3. The method of claim 1, wherein:

modifying the language model with the designated pruning weight mask is performed responsive to receiving the first boundary token, and modifying the language model with the successive pruning weight mask is performed responsive to receiving the second boundary token.

4. The method of claim 1, wherein:

the designated pruning weight mask modifies the language model only during the selected execution phase, and the successive pruning weight mask modifies the language model only during the subsequent execution phase.

5. The method of claim 1, further comprising:

generating the designated pruning weight mask prior to processing the language model; and generating the successive pruning weight mask prior to processing the language model.

6. The method of claim 1, further comprising:

executing, prior to receiving the first boundary token, a classifier model on the input to output a pruning threshold; and generating the designated pruning weight mask according to the pruning threshold.

7. The method of claim 1, further comprising:

executing, prior to receiving the second boundary token, a classifier model on the input to output a second pruning threshold; and generating the successive pruning weight mask according to the second pruning threshold.

8. The method of claim 7, wherein the designated pruning weight mask or the successive pruning weight mask comprises a plurality of pruning values corresponding to a plurality of weights of the language model, and wherein the method further comprises:

comparing the pruning threshold to each of the plurality of pruning values to identify a subset of the plurality of pruning values that satisfy the pruning threshold, identifying a subset of the plurality of weights corresponding to the subset of the plurality of pruning values, and modifying the designated weight mask or the successive weight mask by identifying a plurality of reduction values for the subset of the plurality of weights.

9. The method of claim 7, wherein each of the plurality of reduction values comprises zero such that, when the pruning weight mask is applied to the plurality of weights, each of the subset of the plurality of weights of the language model is set to zero.

10. The method of claim 1, wherein the modified language model uses fewer execution cycles of a computer processor to process the input, relative to a number of execution cycles of the computer processor used by the language model to process the input prior to modifying the language model.

11. A system comprising:

a computer processor;

a data repository in communication with the computer processor and storing:

an input, a first boundary token and a second boundary token, wherein:

the first boundary token comprises a first token that a language model uses during execution to indicate that a selected execution phase is finished and that a subsequent execution phase will be initiated, and the second boundary token comprises a second token that the language model uses during execution to indicate that the subsequent execution phase is finished, a designated pruning weight mask and a successive pruning weight mask, wherein the successive pruning weight mask is different than the designated pruning weight mask, and a plurality of tokens;

the language model in communication with the computer processor and having a first computational efficiency, wherein the language model, when executed by the computer processor, is programmed to:

process the language model on the input, generate the first boundary token during the selected execution phase of the language model, wherein the selected execution phase comprises a first stage of execution of the language model to perform a first task, generate the second boundary token during the subsequent execution phase of the language model, wherein the subsequent execution phase is after the selected execution phase, and wherein the subsequent execution phase comprises a second stage of execution of the language model to perform a second task, subsequent to the first task, generate, during the selected execution phase with the designated pruning weight mask and during the subsequent execution phase with the successive pruning weight mask, a plurality of tokens, and return the plurality of tokens; and a server controller configured, when executed by the computer processor, to:

receive the input, receive, during processing of the language model, the first boundary token, modify, prior to the selected execution phase, the language model with the designated pruning weight mask, receive, while processing, the second boundary token, and modify, prior to the subsequent execution phase, the language model with the successive pruning weight mask, wherein at least one of applying the designated pruning weight mask during the selected execution phase, and applying the successive pruning weight mask during the subsequent execution mask, modifies the language model to a modified language model comprising a final computational efficiency greater than the initial computational efficiency.

12. The system of claim 11, wherein the server controller is further programmed to:

track a gradient movement between the designated pruning weight mask and the successive pruning weight mask, and identify, according to the gradient movement, a parameter of the language model to be modified by at least one of the designated pruning weight mask and the successive pruning weight mask.

13. The system of claim 11, wherein:

modifying the language model with the designated pruning weight mask is performed responsive to receiving the first boundary token, and modifying the language model with the successive pruning weight mask is performed responsive to receiving the second boundary token.

14. The system of claim 11, wherein:

the designated pruning weight mask modifies the language model only during the selected execution phase, and the successive pruning weight mask modifies the language model only during the subsequent execution phase.

15. The system of claim 11, wherein the server controller is further programmed to:

generate the designated pruning weight mask prior to processing the language model, and generate the successive pruning weight mask prior to processing the language model.

16. The system of claim 11, further comprising:

a classifier model executable on the input, prior to receiving the first boundary token and by the processor, to output a pruning threshold, wherein the server controller is further executable to generate the designated pruning weight mask according to the pruning threshold.

17. The system of claim 11, further comprising:

a classifier model executable on the input, prior to receiving the first boundary token and by the processor, to output a pruning threshold, wherein the server controller is further executable to generate the successive pruning weight mask according to the pruning threshold.

18. The system of claim 17, wherein the designated weight mask or the successive pruning weight mask comprises a plurality of pruning values corresponding to a plurality of weights of the language model, and wherein the server controller is further executable to:

compare the pruning threshold to each of the plurality of pruning values to identify a subset of the plurality of pruning values that satisfy the pruning threshold, identify a subset of the plurality of weights corresponding to the subset of the plurality of pruning values, and modify the designated weight mask or the successive weight mask by identifying a plurality of reduction values for the subset of the plurality of weights.

\* \* \* \* \*